United States Patent
Lee et al.

(10) Patent No.: US 9,508,974 B2
(45) Date of Patent: Nov. 29, 2016

(54) PET NONWOVEN FABRIC FOR SEPARATOR FOR SECONDARY BATTERY AND SEPARATOR FOR SECONDARY BATTERY COMPRISING THE SAME

(71) Applicant: TOPTEC HNS CO., LTD., Gyeongsangbuk-do (KR)

(72) Inventors: Hyang Doo Lee, Busan (KR); Suk Hwa You, Busan (KR); Chun Gi Kang, Gyeongbuk (KR); Seung Yong Jee, Gyeongbuk (KR); Do Hyeuk Hwang, Gyeongbuk (KR); Chang Gyu Ahn, Daegu (KR); Byoung Min Kwon, Gyeongbuk (KR); Hyun Sook Kim, Busan (KR)

(73) Assignee: TOPTEC HNS CO., LTD., Gyeongsangbuk-Do (KR)

( * ) Notice: Subject to any disclaimer, the term of this patent is extended or adjusted under 35 U.S.C. 154(b) by 80 days.

(21) Appl. No.: 14/369,145

(22) PCT Filed: Nov. 9, 2012

(86) PCT No.: PCT/KR2012/009429
§ 371 (c)(1),
(2) Date: Jun. 26, 2014

(87) PCT Pub. No.: WO2014/065460
PCT Pub. Date: May 1, 2014

(65) Prior Publication Data
US 2015/0221916 A1    Aug. 6, 2015

(30) Foreign Application Priority Data
Oct. 25, 2012   (KR) ................. 10-2012-0119079

(51) Int. Cl.
*H01M 2/14* (2006.01)
*H01M 2/16* (2006.01)
(Continued)

(52) U.S. Cl.
CPC .............. *H01M 2/162* (2013.01); *D04H 1/40* (2013.01); *D04H 1/435* (2013.01); *D04H 3/011* (2013.01);
(Continued)

(58) Field of Classification Search
CPC .. H01M 2/162; H01M 2/1686; H01M 2/145; H01M 2/1626; H01M 2/1633; H01M 2/164; H01M 2/1646; H01M 2/1653; H01M 2/166; H01M 10/0525; H01M 10/052; D04H 1/40; D04H 1/54; D04H 3/011
See application file for complete search history.

(56) References Cited

U.S. PATENT DOCUMENTS

2003/0017386 A1* 1/2003 Daido ..................... H01M 2/14
                                                            429/142
2006/0019154 A1    1/2006 Imachi et al.

FOREIGN PATENT DOCUMENTS

JP    2005209570         8/2005
JP    2006-092829    *   4/2006  .............. H01M 2/16
(Continued)

OTHER PUBLICATIONS

English Translation of JP2008-077846.*
(Continued)

*Primary Examiner* — Patrick Ryan
*Assistant Examiner* — Kiran Akhtar
(74) *Attorney, Agent, or Firm* — IPLA P.A.; James E. Bame

(57) ABSTRACT

A PET nonwoven fabric for a separator for a secondary battery includes first fibers composed of PET having a melting temperature of 240° C. or more and second fibers composed of PET having a melting temperature of 180~220° C., respective fibers having two types of fibers having different diameters, and has a fine pore size and uniform pore distribution and exhibits superior surface properties, low surface defects, high mechanical strength and excellent mass production. Even when the temperature of a battery is increased to 200° C. or more, the PET nonwoven fabric has heat resistance which prevents thermal runaway and does not generate melting and shrinking.

16 Claims, 2 Drawing Sheets

| (51) | Int. Cl. | |
|---|---|---|
| | *D04H 1/435* | (2012.01) |
| | *D04H 3/011* | (2012.01) |
| | *H01M 10/0525* | (2010.01) |
| | *D04H 1/40* | (2012.01) |
| | *H01M 10/052* | (2010.01) |
| | *D04H 1/54* | (2012.01) |

(52) U.S. Cl.
CPC ........... *H01M 2/145* (2013.01); *H01M 2/1686* (2013.01); *H01M 10/0525* (2013.01); *D04H 1/54* (2013.01); *H01M 10/052* (2013.01); *H01M 2220/20* (2013.01)

(56) References Cited

FOREIGN PATENT DOCUMENTS

| JP | 2006092829 | | 4/2006 | | |
|---|---|---|---|---|---|
| JP | 2008-077846 | * | 4/2008 | ............ | H01M 10/40 |
| JP | 2008077846 | | 4/2008 | | |
| JP | 2011-210680 | * | 10/2011 | .............. | H01M 2/16 |
| JP | 2011210680 | | 10/2011 | | |

OTHER PUBLICATIONS

English Translation of JP2006-092829.*
English Translation of JP2011-210680.*

* cited by examiner

PET NONWOVEN FABRIC FOR SEPARATOR FOR SECONDARY BATTERY AND SEPARATOR FOR SECONDARY BATTERY COMPRISING THE SAME

BACKGROUND

The present invention relates to a polyethyleneterephthalate (PET) nonwoven fabric having high heat resistance and high strength for a separator for a secondary battery, and to a separator for a secondary battery comprising the same.

Secondary batteries, such as lithium ion secondary batteries, lithium polymer secondary batteries and super capacitors (electric double-layer capacitors and similar capacitors), are required to have high energy density, large capacity and thermal stability depending on the demand trends of high performance, lightness, and large scale for power sources for vehicles.

However, conventional lithium ion secondary batteries using a polyolefin separator and a liquid electrolyte, and conventional lithium ion polymer batteries using a gel polymer electrolyte membrane or a polyolefin separator gel-coated with a polymer electrolyte, have heat resistance inadequate for use as batteries having high energy density and high capacity.

A separator is positioned between the cathode and the anode of a battery to thus be responsible for an insulation function, and maintains an electrolyte to provide an ionic conduction path. Furthermore, when the temperature of the battery is excessively increased, the separator exhibits a shutdown function in such a way that part of the separator is melted to thus close pores in order to block the flow of current. If the separator is melted due to further increased temperature, a large hole is formed, and short-circuit may occur between the cathode and the anode. This temperature is referred to as a short-circuit temperature. Generally, it is preferred that a separator have a low shutdown temperature and a higher short-circuit temperature. In the case of a polyethylene separator, the short-circuit temperature approximates to 140° C. upon overheating of the battery.

With the goal of manufacturing a secondary battery having high energy density and large capacity with a higher short-circuit temperature, a separator is required, which has high heat resistance and thus low thermal shrinkage, and high ionic conductivity and thus superior cycle performance.

To obtain such a separator, US Patent Publication No. 2006/0019154 discloses preparation of a polyolefin separator coated with a porous heat-resistant resin, such as polyimide, polyimide or polyamideimide, having a melting temperature of 180° C. or more.

Japanese Patent Application Publication No. 2005-209570 discloses preparation of a polyolefin separator coated with a heat-resistant resin by coating both surfaces of a polyolefin separator with a heat-resistant resin solution including aromatic polyimide, polyimide, polyethersulfone, polyetherketone or polyetherimide, having a melting temperature of 200° C. or more, and then performing immersion in a coagulant, water washing and drying. As such, a phase separation agent for imparting porosity is added to the heat-resistant resin solution in order to reduce a decrease in ionic conductivity, and the amount of applied heat-resistant resin is limited to 0.5~6.0 g/m².

However, immersion in the heat-resistant resin or coating with the heat-resistant resin may close pores of the polyolefin separator, and thus the movement of lithium ions is limited, undesirably deteriorating charge-discharge properties. Therefore, the separator and the electrolyte membrane as disclosed conventionally do not satisfy both heat resistance and ionic conductivity, and the heat-resistant coating may result in deteriorated output properties. Thus, they are difficult to use for batteries having high energy density and large capacity such as batteries for power sources of vehicles, which require superior performance under severe conditions such as rapid charge-discharge, as well as heat resistance.

SUMMARY OF THE INVENTION

An object of the present invention is to provide a PET nonwoven fabric for a separator, which may exhibit a shutdown function with a high short-circuit temperature, and has porosity and pore size adapted for use in a separator for a secondary battery to thereby manifest superior ionic conductivity and high mechanical strength.

Another object of the present invention is to provide a separator for a secondary battery using the PET nonwoven fabric having high heat resistance and ionic conductivity with reinforced mechanical strength.

An aspect of the present invention provides a PET nonwoven fabric for a separator for secondary battery, which may be used as a substrate for a separator for secondary battery, and comprises two kinds of PET fibers having different melting temperatures. In an embodiment, the two kinds of PET fibers include first fibers comprising PET having a melting temperature of 240° C. or more and second fibers comprising PET having a melting temperature of 180~220° C., In an embodiment, the amount of the first fibers is preferably 40~70 wt % based on the total weight of the nonwoven fabric, and the amount of the second fibers is preferably 30~60 wt % based on the total weight of the nonwoven fabric.

In an embodiment, the first fibers have an aspect ratio of 500~2000, and include two types of fibers (i) having a diameter ranging from 0.7 µm to less than 2.3 µm and fibers (ii) having a diameter ranging from 2.3 µm to 5.5 µm. As such, the amount ratio of the fibers (i) to the fibers (ii) is preferably 95:5~5:95, and more preferably 70:30~30:70.

In an embodiment, the second fibers have an aspect ratio of 500~2000, and include fibers (iii) having a diameter ranging from 2.0 µm to less than 4.3 µm, and fibers (iv) having a diameter ranging from 4.3 µm to 7.0 µm. As such, the amount ratio of the fibers (iii) to the fibers (iv) is preferably 90:10~10:90, and more preferably 60:40~40:60.

In an embodiment, the PET nonwoven fabric preferably has a porosity of 45~85% and an average pore diameter of 0.5~7.0 µm.

In an embodiment, the PET nonwoven fabric preferably has a punching strength of 200~600 gf.

In an embodiment, the PET nonwoven fabric may be provided in the form of a monolayer or a multilayer of two or more layers. In this case, the nonwoven fabric has a total thickness of 10~45 µm, and when the nonwoven fabric is provided in a multilayer form, the thickness of each layer of the multilayer preferably exceeds at least 6.0 µm. In a preferred embodiment, the PET nonwoven fabric may have a double layer structure wherein each layer has a thickness of 8~12 µm.

Another aspect of the present invention provides a separator for a secondary battery, comprising the PET nonwoven fabric as above, and a nanofiber layer formed on one or both surfaces thereof and comprising nanofibers having a diameter of 100~600 nm. Accordingly, the separator for a secondary battery may have sufficiently fine pores to the extent of maintaining the flow of ions while exhibiting an insulation function between the anode and the cathode.

In an embodiment, the nanofibers preferably have a melting temperature of 120~170° C. such that a shutdown function may be exhibited.

In an embodiment, the kinds of nanofibers are not particularly limited, but preferably comprise any one selected from among polytetrafluoroethylene (PTFE), polychlorotrifluoroethylene (PCTFE), polyvinylidenefluoride (PVDF), polyvinylidenefluoride-hexafluoropropylene (PVDF-HFP), polyvinylfluoride (PVF), polyimide, and aramid.

In an embodiment, the separator including the nanofiber layer preferably has a porosity of 40~80% and an average pore diameter of 0.1~1.0 µm.

In an embodiment, the separator preferably has a punching strength of 200~600 gf and a tensile strength of 250~1500 kgf/cm$^2$.

In an embodiment, the secondary battery is preferably a lithium secondary battery.

According to the present invention, a PET nonwoven fabric for a separator and a separator for a secondary battery comprising the same can exhibit superior mechanical strength and high wettability to an electrolyte, and furthermore, is excellent in heat resistance without the addition of a binder resin thanks to the use of two kinds of PETs having different melting temperatures, thereby effectively preventing a battery from shorting out upon overheating. In particular, respective kinds of PET fibers include two types of fibers having different diameters to thus form fine pores and prevent reduction in strength and tangling of fibers, ultimately attaining a separator having uniform pores and porosity.

DETAILED DESCRIPTION OF THE INVENTION

Figure 1:
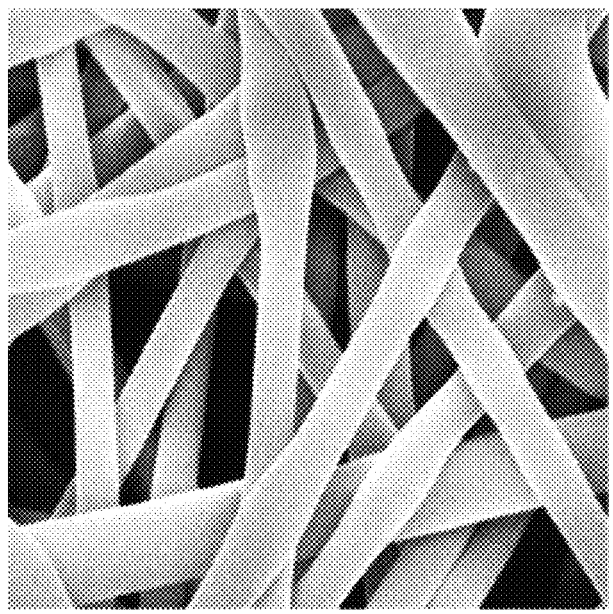
FIG. 1 is an image illustrating the plan view of a PET nonwoven fabric for a separator for a secondary battery according to an embodiment (Example 4) of the present invention.

Unless otherwise defined, all the technical terms used herein have the following definitions and correspond to the meanings as generally understood by those skilled in the art. Also, preferred methods or samples are described herein, but those similar or equivalent thereto are incorporated in the scope of the invention. The contents of all the publications disclosed as references herein are incorporated in the present invention.

The term "about" means the amount, level, value, number, frequency, percent, dimension, size, quantity, weight or length changed by 30, 25, 20, 15, 10, 9, 8, 7, 6, 5, 4, 3, 2 or 1% relative to the referred amount, level, value, number, frequency, percent, dimension, size, quantity, weight or length.

Throughout the description, unless otherwise stated, the term "comprises or includes" and/or "comprising or including" used herein shall be construed as indicating the presence of steps or elements described herein, or the group of steps or elements, but should be understood so as not to exclude presence or additional probability of any other steps or elements, or the group of steps or elements.

Hereinafter, a detailed description will be given of the present invention.

PET Nonwoven Fabric for Separator for Secondary Battery

The present invention provides a nonwoven fabric made of a PET material, and such a PET nonwoven fabric is superior in mechanical strength including tensile strength, punching strength, etc., and has high air permeability and good affinity to an electrolyte. Thereby, wettability of the separator to an electrolyte may be increased, and an electrolyte filling time may be saved, and also the separator may be uniformly filled with the electrolyte.

In particular, a PET nonwoven fabric for a separator for a secondary battery according to the present invention includes two kinds of PETs having different melting temperatures. Specifically, a PET nonwoven fabric may include first fibers comprising PET having a melting temperature of 240° C. or more and second fibers comprising PET having a melting temperature of 180~220° C.

The first fibers are PET fibers having superior heat resistance and high melting temperature and have outstanding thermal stability. Thus, the PET nonwoven fabric according to the present invention has superior dimensional stability and durability and high short-circuit temperature, greatly improving stability of a secondary battery. This fabric is very effective when applied to large-capacity batteries for ESS, electric vehicles, etc. Below, the first fibers are referred to as "heat-resistant fibers," as necessary.

The second fibers are PET fibers having a comparatively low melting temperature and function as binding fibers and thus play a role in binding the first fibers to each other and the first fibers to the second fibers upon heat pressing in the course of preparation of the nonwoven fabric. Because binding treatment is carried out using the same PET material without the use of an additional hydrophobic adhesive resin, a nonwoven fabric having good mutual adhesion and high electrolyte wettability may be obtained. Below, the second fibers are referred to as "binding fibers," as necessary.

The amount ratio of the heat-resistant first fibers and the binding second fibers is not particularly limited. However, if the amount of the heat-resistant fibers is too high, the amount of the binding fibers is comparatively decreased, and thus binding force between the fibers is not sufficient, undesirably separating the fibers from each other in the course of fabrication of the battery. In contrast, if the amount of the binding fibers is too high, the amount of fibers which are tangled with each other upon preparation of the nonwoven fabric may increase, making it impossible to achieve a desired porosity.

Although the thickness (diameter) of the heat-resistant first fibers is not particularly limited in the present invention, as the diameter thereof is thinned to the extent of nano size, a pore size may become fine, thus facilitating the application to a separator for a secondary battery, but problems such as increased preparation cost and tangling of fine nanofibers may occur. In contrast, as the diameter of the first fibers increases, the process may be favorably carried out but mechanical strength may decrease. If the diameter thereof exceeds 5.5 µm, the resulting nonwoven fabric may have too large a pore size.

In the present invention, the first fibers include nano-sized fine fibers (i) having a diameter ranging from about 0.7 µm to less than 2.3 µm and micro-sized fibers (ii) having a diameter ranging from about 2.3 µm to 5.5 µm. Accordingly, a fine pore size may be ensured by the fibers (i), and the use of the fibers (ii) may decrease the preparation cost and may prevent tangling of the fibers. The amount ratio of the fibers (i) to the fibers (ii) is preferably about 95:5~5:95 and more preferably 70:30~30:70.

As the cross-sectional diameter of the second fibers as the binding fibers increases, air permeability may increase. But if the diameter thereof exceeds 7.0 µm, punching strength may decrease. In contrast, as the diameter thereof decreases, strength may increase. But if the diameter thereof is less than 2.0 µm, air permeability may drastically decrease. Thus, the second fibers preferably include two types of fibers having different diameters. Specifically, the second fibers include two types of fibers (iii) having a diameter ranging from about 2.0 µm to less than 4.3 µm, and fibers (iv) having a diameter ranging from about 4.3 µm to 7.0 µm. When such two types of fibers are used in this way, air permeability and strength may be properly maintained. The amount ratio of the fibers (iii) to the fibers (iv) is preferably about 90:10~10:90 and more preferably 60:40~40:60.

The first fibers and the second fibers preferably have an aspect ratio of about 500~2000. If the aspect ratio is less than 500, mechanical strength may decrease. In contrast, if the aspect ratio exceeds about 2000, non-uniform products and tangled fibers may result.

The PET nonwoven fabric for a separator for a secondary battery according to the present invention includes two kinds of PET fibers having different melting temperatures, respective kinds of fibers including two types of fibers having different cross-sectional diameters, that is, thicknesses, thereby enabling formation of a thin film required in the art despite the use of PET and achieving a high porosity of 45~85% and a fine pore diameter of 0.5~7.0 µm with uniform porosity distribution.

Also, the PET nonwoven fabric according to the present invention has vastly superior mechanical strength, with a tensile strength of 250~1500 kgf/cm$^2$ and a punching strength of 200~600 gf.

The PET nonwoven fabric according to the present invention may be provided in the form of a monolayer or a multilayer of two or more layers. In the monolayer or multilayer structure, the total thickness is preferably about 10~45 µm. Compared to a monolayer structure, a multilayer structure has a lower defective rate and more uniform pore size, and may correspond to deformation due to pressing or the like in the course of fabrication of batteries, thus exhibiting superior durability.

The thickness of each layer of the multilayer preferably exceeds at least 6.0 µm. If the thickness thereof is less than that, mass production is difficult, and product uniformity may decrease. In a preferred embodiment, useful is a PET nonwoven fabric having a double layer structure wherein each layer has a thickness ranging from more than 6 µm to 20 µm, and preferably 8~12 µm. Compared to the monolayer structure, the PET nonwoven fabric having a double layer structure is lower in defective rates due to pinholes or impurities, and also has a uniform pore size distribution, resulting in superior quality (Test Example 3).

The method of preparing the PET nonwoven fabric according to the present invention is not particularly limited. For example, it may be prepared by forming a sheet using a known papermaking process and then performing heat pressing. As such, the heat pressing is executed at about 180~220° C. which is a melting temperature of the binding fibers.

As mentioned above, unlike the conventional PET nonwoven fabric having a large pore size, low surface flatness and large surface non-uniformity upon surface coating, the PET nonwoven fabric according to the present invention has a fine pore size, uniform pore size distribution, superior surface properties, low surface defects, high mechanical strength and excellent mass production. Furthermore, the PET nonwoven fabric according to the present invention has heat resistance which prevents thermal runaway and does not generate melting and shrinking, even when increasing the temperature of the battery to 200° C. or more.

Separator for Secondary Battery

The PET nonwoven fabric according to the present invention may be used alone as a separator for a secondary battery or may be utilized as a substrate therefor. Thus, it may be subjected to various surface modifications so as to be adapted for a separator for a secondary battery. For example, a variety of coating layers may be formed through coating with organic/inorganic filler or silicon coating in order to improve properties.

In a preferred embodiment, a nanofiber layer may be formed on one or both surfaces of the PET nonwoven fabric as above.

The nanofibers of the nanofiber layer preferably have an average diameter of about 100~600 nm. If the average diameter of the nanofibers is less than about 100 nm, air permeability of the separator may decrease. In contrast, if the average diameter thereof exceeds about 600 nm, it is not easy to adjust the pore size and the thickness of the separator.

Also, the nanofibers are preferably responsible for a shutdown function. The shutdown function means that, when the inner temperature of the battery increases, the nanofibers are melted and may thus close the pores of the separator, thereby preventing movement of ions, and consequently the flow of current is blocked. Specifically, in the case where the battery is exposed to high temperature, the nanofibers may expand or may be melted to thus close pores of the separator, so that the flow of current is blocked and the risk of explosion of the battery is decreased. As such, if the melting temperature of the nanofibers is lower than about 120° C., shutdown may operate at a very low temperature and thus current is frequently blocked, undesirably losing the function of the battery. In contrast, if the melting temperature of the nanofibers is higher than about 170° C., shutdown is not efficiently carried out, undesirably causing the risk of explosion of the battery. Hence, the nanofibers may have a melting temperature of about 120~170° C. so as to efficiently implement the shutdown function.

The material for the nanofibers is not particularly limited so long as it implements the aforementioned shutdown function, and specific examples thereof may include any one selected from among polytetrafluoroethylene (PTFE), polychlorotrifluoroethylene (PCTFE), polyvinylidenefluoride (PVDF), polyvinylidenefluoride-hexafluoropropylene (PVDF-HFP), polyvinylfluoride (PVF), polyimide, and aramid.

The nanofibers are preferably applied in an amount of about 1.0~10.0 g/m$^2$ per unit area of the substrate. The nanofiber layer may be formed by electrospinning nanofibers on the PET nonwoven fabric substrate. The electrospinning process is not particularly limited, and may be modified so as to be adapted for the present invention based on the manner known in the art. For example, the electrospinning process may include applying a voltage so that a spinning solution is electrically charged, extruding the charged spinning solution via a spinning nozzle to form nanofibers, and integrating the nanofibers on a collector having the charge opposite to that of the spinning solution. The electrospinning process facilitates the formation of fibers having a nano-size diameter. The nanofiber layer formed by the electrospinning process is thin and has high porosity. In a preferred embodiment, the thickness of the nanofiber layer is about 10~30% of that of the PET nonwoven fabric layer which is the substrate layer, and specifically may be about 1~13.5 μm. The separator according to the present invention has low electric resistance, and may greatly improve performance of the secondary battery when applied to such a battery.

The separator according to the present invention, which is configured such that the nanofiber layer is formed on the PET nonwoven fabric substrate disclosed herein, has a high porosity of 40~80% and a fine pore size of about 0.1~1.0 μm with uniform porosity distribution. Furthermore, it exhibits excellent mechanical strength, for example, a tensile strength of about 250~1500 kgf/cm$^2$ and a punching strength of about 200~600 gf.

As mentioned above, the separator according to the present invention is advantageous because of superior heat resistance and mechanical strength, good electrolyte wettability and surface properties, fine and uniform pore size due to coating with nanofibers, and high bendability and thus dendrite resistance.

The separator according to the present invention may be applied to a non-aqueous secondary battery, for preferable example, a lithium secondary battery such as a lithium ion secondary battery, a lithium polymer secondary battery, etc.

A better understanding of the present invention may be obtained through the following examples which are set forth to illustrate, but are not to be construed to limit the present invention, which will be apparent to those skilled in the art.

<Evaluation Method>

1. Air Permeability

A sample is spread on an air permeability meter and then pressed down by a cylindrical chamber having a diameter 15 cm to thus be fixed. The pressure is set to 600 Pa and the measured value is represented in the unit of cm$^3$/cm$^2$/s. Specifically, air permeability is determined in a manner that measures the amount of air passed through the sample when the set pressure is applied to the sample. Measurement is performed at three points on the diagonal line per sample and the average value is determined.

2. Punching Strength

To measure punching strength, a sample is spread and fixed to a test frame. The fixed sample is applied to a needle having a diameter of 1 mm under a force of 1 kgf until it is punched. The value when the sample is punched is recorded in the unit of gf. Ten measurements per sample are performed and the average value is determined.

3. Tensile Strength

A sample is cut to a length of 10 cm and a width of 1 cm in MD and TD, and then fixed to the top and bottom of a tensile strength meter with clips. The tensile strength is measured at a speed of 500 mm/min. The strength when the sample is broken under a force applied in the top and bottom directions is represented as tensile strength. Five measurements per sample are performed and the average value is determined. The unit is kgf/cm$^2$.

4. Thermal Stability

Three samples having a size of 140 mm×60 mm are prepared and crosslines are drawn at 100 mm in a length direction and 40 mm in a width direction. The test temperature is set, and when an oven reaches the set temperature and thus is maintained in temperature, the sample is placed in the oven and allowed to stand for 60 min, taken out of the oven and then allowed to stand at room temperature for 10 min. The decreased length of the crosslines compared to the length of the crosslines before testing is measured, and a thermal shrinkage is calculated.

$$\text{Thermal shrinkage (\%): (initial length−length after oven testing)/initial length×100}$$

5. Pore Size

A pore size is measured using a porometer. A sample is cut to a size of 30 mm×30 mm and then fixed to a porometer, and results of the sample in a dry state and a wet state using a standard solution are calculated by means of differential/integral calculus, thus determining the average pore size, maximum pore size and pore distribution of the sample.

6. Pinholes/Impurities

A sample is placed on a stand equipped with a fluorescent lamp, and the passing of light of the fluorescent lamp is defined as pinholes, and spots (black points) having a size of 2 mm or more are defined as impurities, and the number thereof is counted.

7. SEM Analysis

An e-beam is generated at a voltage of 20 KV and a beam current of 10 amperes from filaments provided to the head of SEM. Such an e-beam is reflected onto a sample to form an image. The sample is fixed to a mount having a diameter of about 2 cm, and a silver paste is applied to both ends thereof and gold for pretreatment is applied. The pretreated sample is inserted and analyzed at a desired magnification using software.

Preparative Example 1

Preparation of PET Nonwoven Fabric (First Fibers and Second Fibers)

Nonwoven fabrics were manufactured through the following procedures using first fibers composed of PET fibers (Kuraray, Kolon) having a melting temperature of 240° C. or more and second fibers composed of PET fibers (Kuraray, Kolon) having a melting temperature of 180~220° C. at different weight ratios as shown in Table 1 below, the first fibers comprising fibers (i) having a diameter of 1.5 μm and fibers (ii) having a diameter of 2.5 μm at a ratio of 50:50, and the second fibers comprising fibers (iii) having a diameter of 4.0 μm and fibers (iv) having a diameter of 5.0 μm at a ratio of 50:50.

1-1. A sample prepared in a beaker was placed in a laboratory handsheet machine. The sample was composed of first fibers and second fibers in different amounts of wt % with the same concentration selected from the range of 0.01~0.1 wt % relative to water so as to achieve high dispersibility.

1-2. The sample placed in the handsheet machine was stirred at a high rate of 3600 rpm for 1 min using a blade type stirrer so that PET fibers were efficiently dispersed. If the stirring time is too long, PET fibers are tangled with each other and thus less dispersed, and after fabrication of the sample, the fibers thus tangled are regarded as impurities and thus quality may deteriorate.

1-3. The uniformly dispersed material was placed on a wire mesh so as to be naturally dewatered for a predetermined period of time.

1-4. After primary natural dewatering, the sample was wrapped in a fine blanket and passed through a roll dryer at 105° C., and thus secondary dewatering was carried out.

1-5. After secondary dewatering, the sample was worked at a predetermined temperature under predetermined pressure using a heat calendering machine at 180~220° C., and each sample was evaluated.

Examples 1~6

Weight Ratio (%) of First Fibers/Second Fibers

A sample having a final thickness of 20 μm was manufactured using first fibers and second fibers at different weight ratios through the above method. The weight ratios in the examples are as follows.

TABLE 1

|  | 1st Fibers wt % | 2nd Fibers wt % | Note |
|---|---|---|---|
| Ex. 1 | 30 | 70 | 20 μm Thick. |
| Ex. 2 | 40 | 60 | 20 μm Thick. |
| Ex. 3 | 50 | 50 | 20 μm Thick. |
| Ex. 4 | 60 | 40 | 20 μm Thick. |
| Ex. 5 | 70 | 30 | 20 μm Thick. |
| Ex. 6 | 80 | 20 | 20 μm Thick. |

Test Example 1

Air permeability, punching strength, tensile strength and thermal stability tests of the PET nonwoven fabrics of Examples 1 to 6 and a commercially available separator (Celgard®2320) from Celgard, USA, were performed. The results are shown in Table 2 below. Also, the SEM image of the plan view of the sample of Example 4 is illustrated in FIG. 1. The sample of Example 4 had an air permeability of 15.8 cm³/cm²/s, a punching strength of 487 gf, a tensile strength of 1230 kgf/cm² in MD and 675 kgf/cm² in TD.

TABLE 2

|  | Air perme- ability | Punch- ing strength | Tensile strength | | Thermal stability (shrinkage %) | | | | | |
|---|---|---|---|---|---|---|---|---|---|---|
|  |  |  |  |  | 105° C. | | 125° C. | | 150° C. | |
|  |  |  | MD | TD | MD | TD | MD | TD | MD | TD |
| Ex. 1 | Δ | X | Δ | Δ | ◎ | ◎ | ◎ | ◎ | ⊙ | ⊙ |
| Ex. 2 | ○ | ○ | ○ | ○ | ◎ | ◎ | ◎ | ◎ | ◎ | ◎ |
| Ex. 3 | ⊙ | ⊙ | ⊙ | ⊙ | ◎ | ◎ | ◎ | ◎ | ◎ | ◎ |
| Ex. 4 | ⊙ | ◎ | ◎ | ◎ | ◎ | ◎ | ◎ | ◎ | ◎ | ◎ |
| Ex. 5 | ◎ | ⊙ | ⊙ | ⊙ | ◎ | ◎ | ◎ | ◎ | ◎ | ◎ |
| Ex. 6 | ◎ | Δ | Δ | Δ | ◎ | ◎ | ◎ | ◎ | ◎ | ◎ |
| Celgard Separator (20 μm) | X | ⊙ | ◎ | X | ⊙ | ⊙ | X | Δ | X | Δ | excellent: ◎
good: ⊙
fair: ○
poor: Δ
very poor: X

Preparative Example 2

Nonwoven fabrics were manufactured in the same manner as in Preparative Example 1, with the exception that when 60 wt % of first fibers comprising PET fibers (Kuraray, Kolon) having a melting temperature of 240° C. or more and 40 wt % of second fibers comprising PET fibers (Kuraray, Kolon) having a melting temperature of 180~220° C. were mixed, two types of fibers having different diameters as shown in Table 3 below were used.

TABLE 3

|  | 1st Fibers | | 2nd Fibers | | |
|---|---|---|---|---|---|
|  | Fibers (i) | Fibers (ii) | Fibers (iii) | Fibers (iv) | Note |
| Ex. 7 | 5 | 95 | 50 | 50 | 20 μm Thick. |
| Ex. 8 | 30 | 70 | 50 | 50 | 20 μm Thick. |
| Ex. 9 | 50 | 50 | 50 | 50 | 20 μm Thick. |
| Ex. 10 | 70 | 30 | 50 | 50 | 20 μm Thick. |
| Ex. 11 | 95 | 5 | 50 | 50 | 20 μm Thick. |
| Ex. 12 | 50 | 50 | 10 | 90 | 20 μm Thick. |
| Ex. 13 | 50 | 50 | 30 | 70 | 20 μm Thick. |
| Ex. 14 | 50 | 50 | 50 | 50 | 20 μm Thick. |
| Ex. 15 | 50 | 50 | 70 | 30 | 20 μm Thick. |
| Ex. 16 | 50 | 50 | 90 | 10 | 20 μm Thick. |
| C. Ex. 1 | 100 | 0 | 50 | 50 | 20 μm Thick. |
| C. Ex. 2 | 0 | 100 | 50 | 50 | 20 μm Thick. |
| C. Ex. 3 | 50 | 50 | 100 | 0 | 20 μm Thick. |
| C. Ex. 4 | 50 | 50 | 0 | 100 | 20 μm Thick. |

Test Example 2

Air permeability, punching strength, tensile strength and thermal stability tests of the PET nonwoven fabrics of Examples 7 to 16 and Comparative Examples 1 to 4 were performed. The results are shown in Table 4 below.

TABLE 4

|  | Air perme- ability | Punch- ing strength | Tensile strength | | Thermal stability (shrinkage %) | | | | | |
|---|---|---|---|---|---|---|---|---|---|---|
|  |  |  |  |  | 105° C. | | 125° C. | | 150° C. | |
|  |  |  | MD | TD | MD | TD | MD | TD | MD | TD |
| Ex. 7 | ◎ | ○ | ◎ | ◎ | ◎ | ◎ | ◎ | ◎ | ◎ | ◎ |
| Ex. 8 | ⊙ | ⊙ | ◎ | ◎ | ◎ | ◎ | ◎ | ◎ | ◎ | ◎ |
| Ex. 9 | ⊙ | ⊙ | ◎ | ◎ | ◎ | ◎ | ◎ | ◎ | ◎ | ◎ |
| Ex. 10 | ⊙ | ⊙ | ◎ | ◎ | ◎ | ◎ | ◎ | ◎ | ◎ | ◎ |
| Ex. 11 | ○ | ◎ | ◎ | ◎ | ◎ | ◎ | ◎ | ◎ | ◎ | ◎ |
| Ex. 12 | ◎ | ○ | ◎ | ◎ | ◎ | ◎ | ◎ | ◎ | ◎ | ◎ |
| Ex. 13 | ⊙ | ⊙ | ◎ | ◎ | ◎ | ◎ | ◎ | ◎ | ◎ | ◎ |
| Ex. 14 | ⊙ | ⊙ | ◎ | ◎ | ◎ | ◎ | ◎ | ◎ | ◎ | ◎ |
| Ex. 15 | ⊙ | ⊙ | ⊙ | ⊙ | ◎ | ◎ | ◎ | ◎ | ◎ | ◎ |
| Ex. 16 | ○ | ○ | ⊙ | ⊙ | ◎ | ◎ | ◎ | ◎ | ◎ | ◎ |
| C. Ex. 1 | X | ⊙ | ⊙ | ⊙ | ◎ | ◎ | ◎ | ◎ | ◎ | ◎ |
| C. Ex. 2 | ⊙ | X | ○ | ○ | ◎ | ◎ | ◎ | ◎ | ◎ | ◎ |
| C. Ex. 3 | X | ⊙ | ⊙ | ⊙ | ◎ | ◎ | ◎ | ◎ | ◎ | ◎ |
| C. Ex. 4 | ⊙ | X | ○ | ○ | ◎ | ◎ | ◎ | ◎ | ◎ | ◎ | excellent: ◎
good: ⊙
fair: ○
poor: Δ
very poor: X

Preparative Example 3

Preparation of Double-Layer PET Nonwoven Fabric

Nonwoven fabrics having different structures with a final thickness of 18 μm were manufactured through the following procedures using PET first fibers having a melting temperature of 240° C. or more (fibers (i):fibers (ii)=65:35), and PET second fibers having a melting temperature of 180~220° C. (fibers (iii):fibers (iv)=45:55), at a weight ratio (%) of 60:40.

2-1. A sample prepared in a beaker was placed in a laboratory handsheet machine (The sample was composed of first fibers and second fibers at a weight ratio (%) of 60:40 with the same concentration selected from the range of about 0.01~0.1 wt % relative to water so as to achieve high dispersibility).

2-2. The sample placed in the handsheet machine was stirred at a high rate of 3600 rpm for 1 min using a blade type stirrer so that PET fibers were efficiently dispersed. If the stirring time is too long, PET fibers are tangled with each other and thus less dispersed, and after fabrication of the sample, the PET fibers thus tangled are regarded as impurities and thus quality may deteriorate.

2-3. Upon formation of a monolayer 18 μm thick, primary dewatering, secondary dewatering using a dryer and tertiary heat calendaring were sequentially performed. Upon formation of a sample having a two-layer structure, papermaking was performed at 9 μm each, primary natural dewatering was carried out and then two layers each having a thickness of 9 μm were stacked, followed by secondary dewatering using a dryer and tertiary heat calendaring. Upon formation of a three-layer structure, papermaking was performed at 6 μm each, primary natural dewatering was executed and then three layers each having a thickness of 6 μm were stacked, followed by secondary dewatering using a dryer and tertiary heat calendaring.

2-4. The uniformly dispersed material was placed on a wire mesh so as to be naturally dewatered for a predetermined period of time.

2-5. After primary natural dewatering, the sample was wrapped in a fine blanket and passed through a roll dryer at 105° C., and thus secondary dewatering of the sample was carried out.

2-6. After secondary dewatering, the sample was subjected to a tertiary process at a predetermined temperature under predetermined pressure using a heat calendering machine at 180~220° C., and each sample was evaluated.

TABLE 5

Number of layers of PET nonwoven fabric

| | Each layer thick. (μm) | Number of layers | Final product thick. (μm) |
|---|---|---|---|
| Ex. 12 | 18 | 1 | 18 |
| Ex. 13 | 9 | 2 | 18 |
| Ex. 14 | 6 | 3 | 18 |

Test Example 3

The above samples (Examples 12~14) were evaluated for the following.

TABLE 6

| | Punching strength | Pinholes | Impurities | Pore size distribution | Note |
|---|---|---|---|---|---|
| Ex. 12 (monolayer) | ⊙ | ○ | ⊙ | ○ | |
| Ex. 13 (two-layer) | ◎ | ⊙ | ⊙ | ◎ | |
| Ex. 14 (three-layer) | Δ | ○ | ⊙ | Δ | | excellent: ◎
good: ⊙
fair: ○
poor: Δ
very poor: X

Preparation Example 4

Figure 2:
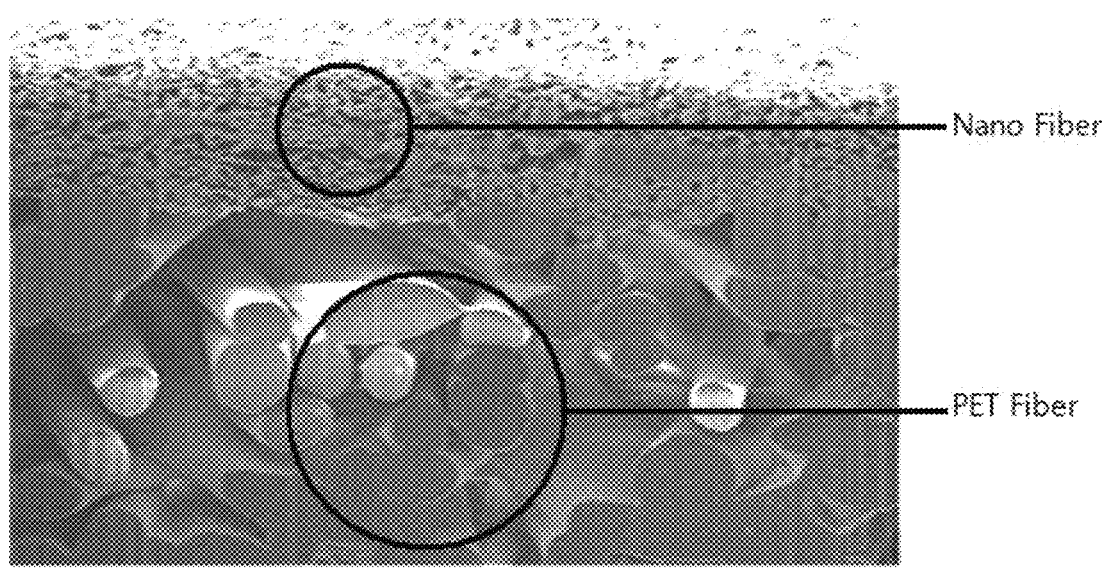
FIG. 2 is an image illustrating the cross-sectional view of a separator for a secondary battery including a nanofiber layer according to an embodiment (Example 15) of the present invention.

A separator for a secondary battery (Example 15) was manufactured by electrospinning PVDF nanofibers on the PET nonwoven fabric layer of Example 10. The SEM image of the separator is illustrated in FIG. 2. This separator had a porosity of 74%, an average pore diameter of 0.32 μm, a minimum pore diameter of 0.15 μm, and a maximum pore diameter of 0.48 μm with uniform pore distribution. Also, punching strength was 507 gf, and tensile strength was 1120 kgf/cm$^2$ (MD) and 652 kgf/cm$^2$ (TD).

Although the preferred embodiments of the present invention have been disclosed for illustrative purposes, those skilled in the art will appreciate that various modifications, additions and substitutions are possible, without departing from the scope and spirit of the invention as disclosed in the accompanying claims. The disclosed embodiments should be taken into consideration not from limited point of view but from descriptive point of view. The scope of the present invention is shown not in the above description but in the claims, and all differences within the range equivalent thereto will be understood to be incorporated in the present invention.

The invention claimed is:

1. A polyethyleneterephthalate (PET) nonwoven fabric for a separator for secondary battery, comprising first fibers comprising PET having a melting temperature of 240° C. or more and second fibers comprising PET having a melting temperature of 180~220° C.,
   wherein the first fibers have an aspect ratio of 500~2000, and include two types of fibers comprising fibers (i) having a diameter ranging from 0.7 μm to less than 2.3 μm and fibers (ii) having a diameter ranging from 2.3 μm to 5.5 μm, and
   the second fibers have an aspect ratio of 500~2000, and include fibers (iii) having a diameter ranging from 2.0 μm to less than 4.3 μm, and fibers (iv) having a diameter ranging from 4.3 μm to 7.0 μm.

2. The PET nonwoven fabric of claim 1, comprising, based on a total weight of the nonwoven fabric, 40~70 wt % of the first fibers and 30~60 wt % of the second fibers.

3. The PET nonwoven fabric of claim 1, wherein an amount ratio of the fibers (i) to the fibers (ii) in the first fibers is 95:5~5:95.

4. The PET nonwoven fabric of claim 1, wherein an amount ratio of the fibers (iii) to the fibers (iv) in the second fibers is 90:10~10:90.

5. The PET nonwoven fabric of claim 1, wherein the PET nonwoven fabric has a porosity of 45~85% and an average pore diameter of 0.5~7.0 μm.

6. The PET nonwoven fabric of claim 1, wherein the PET nonwoven fabric has a punching strength of 200~600 gf and a tensile strength of 250~1500 kgf/cm$^2$.

7. The PET nonwoven fabric of claim 1, which is provided in a form of a monolayer or a multilayer of two or more layers.

8. The PET nonwoven fabric of claim 7, wherein the nonwoven fabric has a total thickness of 10~45 μm, and when the nonwoven fabric is provided in a multilayer form, a thickness of each layer of the multilayer exceeds at least 6.0 μm.

9. The PET nonwoven fabric of claim 7, which has a double layer structure wherein each layer has a thickness from more than 6 μm to 20 μm.

10. A separator for a secondary battery, comprising the PET nonwoven fabric of claim 1, and a nanofiber layer formed on one or both surfaces thereof and comprising nanofibers having a diameter of 100~600 nm.

11. The separator of claim 10, wherein the nanofibers have a melting temperature of 120~170° C.

12. The separator of claim 11, wherein the nanofibers comprise any one selected from among polytetrafluoroethylene (PTFE), polychlorotrifluoroethylene (PCTFE), polyvinylidenefluoride (PVDF), polyvinylidenefluoride-hexafluoropropylene (PVDF-HFP), polyvinylfluoride (PVF), polyimide, and aramid.

13. The separator of claim 10, wherein a thickness of the nanofiber layer is 10~30% of that of the PET nonwoven fabric which is a substrate layer.

14. The separator of claim 10, wherein the separator has a porosity of 40~80% and an average pore diameter of 0.1~1.0 μm.

15. The separator of claim 10, wherein the separator has a punching strength of 200~600 gf and a tensile strength of 250~1500 kgf/cm$^2$.

16. The separator of claim 10, wherein the secondary battery is a lithium secondary battery.

\* \* \* \* \*